Figures 1, 2:
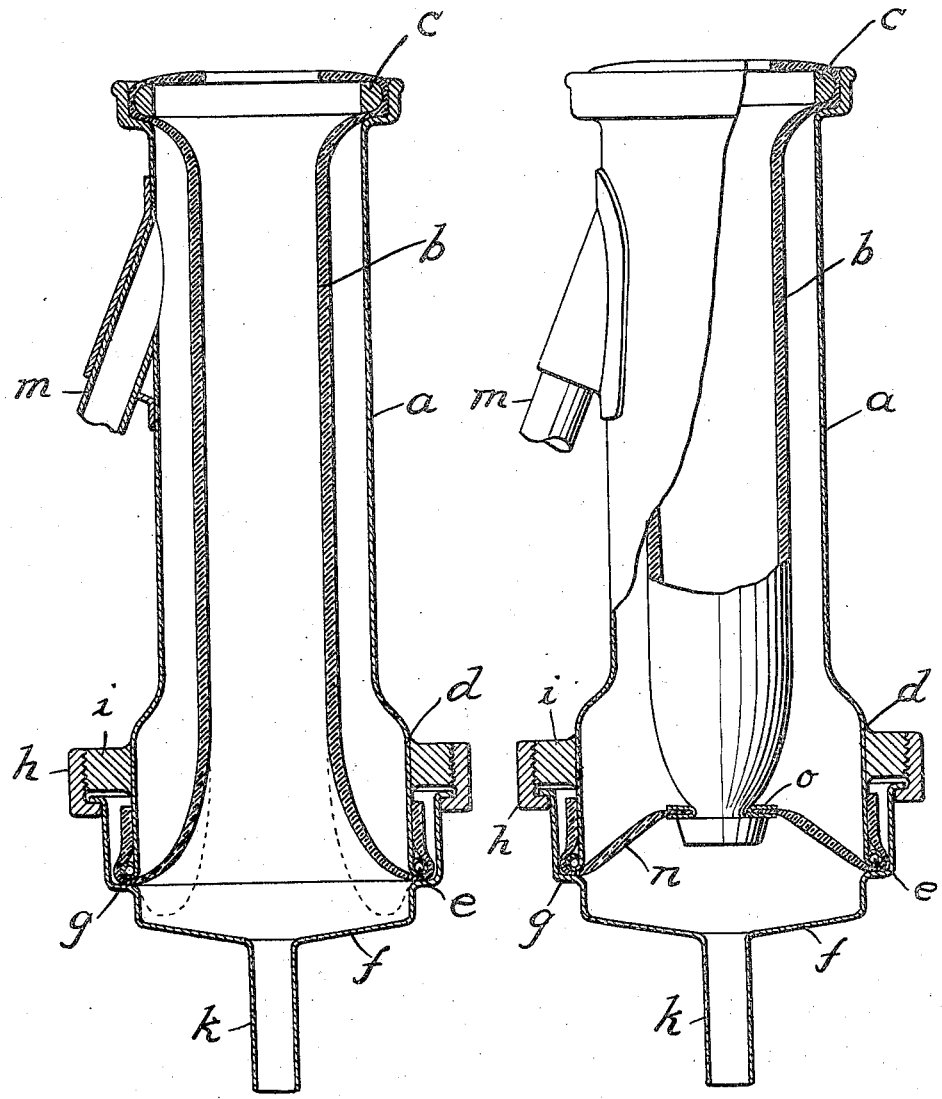

Patented July 9, 1935

2,007,162

UNITED STATES PATENT OFFICE 2,007,162

MILKING MACHINE TEAT CUP

Cyrus Howard Hapgood, Nutley, N. J., assignor to The De Laval Separator Company, New York, N. Y., a corporation of New Jersey Application March 19, 1932, Serial No. 599,875

5 Claims. (Cl. 31—85)

In an application filed by Walter A. Scott March 19, 1932, Serial No. 599,911, upon which issued Patent No. 1,971,467, dated August 28, 1934, there is set forth a double chambered teat cup comprising means dependent for its operation on the pneumatic pulsations within the outer teat cup chamber, to alternately contract and expand the liner in a longitudinal direction and thereby massage the cow's teat during the milking procedure. The operation of the Scott teat cup involves the provision of differential air pressure areas which create, during the pneumatic pulsations, an alternate balancing and unbalancing of air pressure between the outer teat cup chamber and the atmosphere.

The object of the present invention is to accomplish the same result, in a more efficient and simpler manner, by the provision of differential air pressure areas which create, during the pneumatic pulsations, an alternate balancing and unbalancing of air pressures between the outer teat cup chamber and the vacuum space within or communicating with the milk chamber of the teat cup.

The invention may be embodied in various specific forms, two of which are shown in the drawing, Figs. 1 and 2 being longitudinal sectional views of such two embodiments.

The teat cup comprises an outer metal shell the main body $a$ of which is expanded at its upper end and an inner rubber liner $b$ which is stretched and expanded at its upper end and there held within the expanded upper end of the shell $a$ by means of an internal ring $c$. The lower end $d$ of the shell, which may be integral with its main body, is expanded in diameter and is rolled outward at its lower extremity to form a bead $e$. The lower end of the liner is expanded in diameter and is bent around the bead $e$ and extends for a short distance along the outer wall of the lower end $d$ of the shell. An end head $f$, which, with the shell $a$, $d$, comprises the casing of the teat cup, in part extends below, and in part surrounds, the lower end $d$ of the shell and is provided with a shoulder $g$ between which and the bead $e$ the liner is confined. The head $f$ is held in fixed relation with the shell, and is pressed against the liner as described, by means of a ring $h$, which is threaded on a ring $i$ secured to the shell and has an inwardly extending annular flange supporting an outwardly extending annular flange at the upper extremity of the head $f$. The head $f$ is provided with a nozzle $k$, upon which is adapted to be slipped a hose or tube (not shown), which is connected with a source of vacuum and a milk receiver and through which the milk from the teat is conveyed to the milk receiver.

Projecting from the shell is a nozzle $m$ upon which is adapted to be slipped a hose or tube connected with a source of pneumatic pulsations.

In one respect the operation is the same as that characterizing the ordinary commercial teat cup; that is, the milk chamber of the teat cup, comprising the space enclosed by the liner $b$ and the cup $f$, is subjected to a constant partial vacuum, while the space surrounding the liner—the pulsation chamber— is connected alternately with the atmosphere and with a partial vacuum. The absolute pressures in the two teat cup chambers are preferably, although not necessarily, approximately the same during the low pressure intervals within the outer teat cup chamber.

During the low pressure intervals within the outer teat cup chamber, if the pressures within the two chambers are approximately the same, the liner assumes the shape shown in Fig. 1, which is also the shape which it assumes when the teat cup is not in use. When the outer teat cup chamber is subjected to atmospheric or other absolute pressure higher than that within the liner, the liner is compressed radially to squeeze the teat, as in the ordinary double-chambered teat cups. The expanded upper and lower ends of the liner are also subjected to differential pressures tending to stretch the liner longitudinally, but owing to the greater annular area of the outwardly bent lower end of the teat cup, the unbalanced pressures become operative to push the lower end of the liner downward and cause it to assume a form more or less like that shown in dotted lines in Fig. 1. To simplify the drawing the usual inward displacement or compression of the liner is not illustrated, the drawing being intended to indicate only the way in which the liner is expanded longitudinally during the unbalanced pressure intervals. When the outer teat cup chamber is connected with a partial vacuum, the absolute pressure within the outer teat cup chamber is reduced, preferably but not necessarily so as to balance the constant absolute pressure within the milk chamber, and the liner is contracted longitudinally to its normal shape.

A notable advantage of my improved teat cup is that the desired longitudinal back and forth movement of the liner is obtained without in any way adding to the parts, or otherwise complicating, the construction of an ordinary teat cup.

In Fig. 2, instead of expanding the lower end of the liner, it is contracted to provide a neck which is surrounded by an annular diaphragm secured to the casing. In the particular embodiment shown, the diaphragm $n$ is of rubber and its peripheral portion is secured in position in the same manner as is secured the lower end of the liner in Fig. 1. The inner circular edge of the diaphragm may carry a metal ring $o$ which engages the neck of the liner.

What I claim and desire to protect by Letters Patent is:

1. A teat cup comprising an outer pneumatic pulsation chamber and an inner low pressure chamber adapted to receive the teat and through which the milk is discharged, a flexible and elastic liner separating the two chambers and which is normally not under tension and is expansible and contractible longitudinally, the inner low pressure chamber extending below as well as within the outer pulsation chamber, the lower end of the outer pulsation chamber being substantially expanded radially and the lower end of the liner being connected with the expanded lower end of the outer pulsation chamber to afford an air pressure surface effective, during the high pressure intervals of said pneumatic pulsations, to elongate the liner, the liner contracting longitudinally during the low pressure pneumatic pulsation intervals.

2. A teat cup comprising an outer shell having an expanded lower end, a flexible and elastic liner, and means connecting the upper end of the liner with the upper end of the shell, the lower end portion of the liner being connected with the expanded lower end of the shell at a radial distance from its longitudinal center substantially greater than the radial distance of its upper end connection with the upper end of the shell, the lower end portion of the liner being free to move longitudinally, the liner being normally not under tension, the space within and below the liner being adapted to be maintained under a partial vacuum, the space between the liner and shell providing an outer chamber adapted to receive pneumatic pulsations and thereby, by the alternate unbalancing and balancing of pneumatic pressures on opposite sides of the lower end, effect an alternate elongation and contraction of the liner.

3. A teat cup comprising an outer shell having an expanded lower end, a flexible and elastic liner bent outward at its upper end and secured to the upper end of the shell and bent outward at its expanded lower end and secured to the lower end of the shell at a radial distance from its longitudinal center substantially greater than the radial distance of its upper end connection with the upper end of the shell, the liner being normally not under tension, the space within and below the liner being adapted to be maintained under a partial vacuum, the space between the liner and shell providing an outer chamber adapted to receive pneumatic pulsations and thereby, by the alternate unbalancing and balancing of pneumatic pressures on opposite sides of the outwardly bent lower end of the liner, alternately pulling down, and permitting the retraction of, the lower end of the liner.

4. A teat cup comprising an outer casing having an expanded lower end, a flexible and elastic tubular liner the upper end of which is bent outward and secured to the upper end of the casing, an annular diaphragm connecting the lower end of the tubular liner and the expanded lower end of the casing, the lower end of the casing having a milk outlet, whereby when the space enclosed by the liner and by the lower end of the casing is maintained under a partial vacuum and the space between the liner and shell is subjected to pneumatic pulsations, said diaphragm will be operated by pneumatic pressure changes to alternately elongate and contract the liner.

5. A teat cup comprising an outer shell open at its upper teat-receiving end and provided at its opposite lower end with a milk outflow opening, a flexible and elastic inner liner, the liner between its ends being spaced from the shell to provide an annular pulsation chamber, the space within the liner and the space within the shell below the liner providing a low pressure chamber, the shell being of substantially greater diameter in its lower end portion than in its upper end portion, and means connecting opposite ends of the liner with the larger and smaller diameter parts of the shell respectively at respectively relatively large and small distances from the center line of the teat cup, the liner being normally not under tension, thereby affording differential pressure areas at opposite ends of the pulsation chamber whereby, when the annular chamber is subjected to pneumatic pulsation, the liner will, during high and low pressure periods respectively, appreciably alternately expand and contract in a longitudinal direction and subject the teat to a massaging action.

CYRUS HOWARD HAPGOOD.